Dec. 17, 1929.   R. LA FRANCE   1,739,845
MACHINE FOR FORMING GLASS ARTICLES
Original Filed April 22, 1924   4 Sheets-Sheet 3
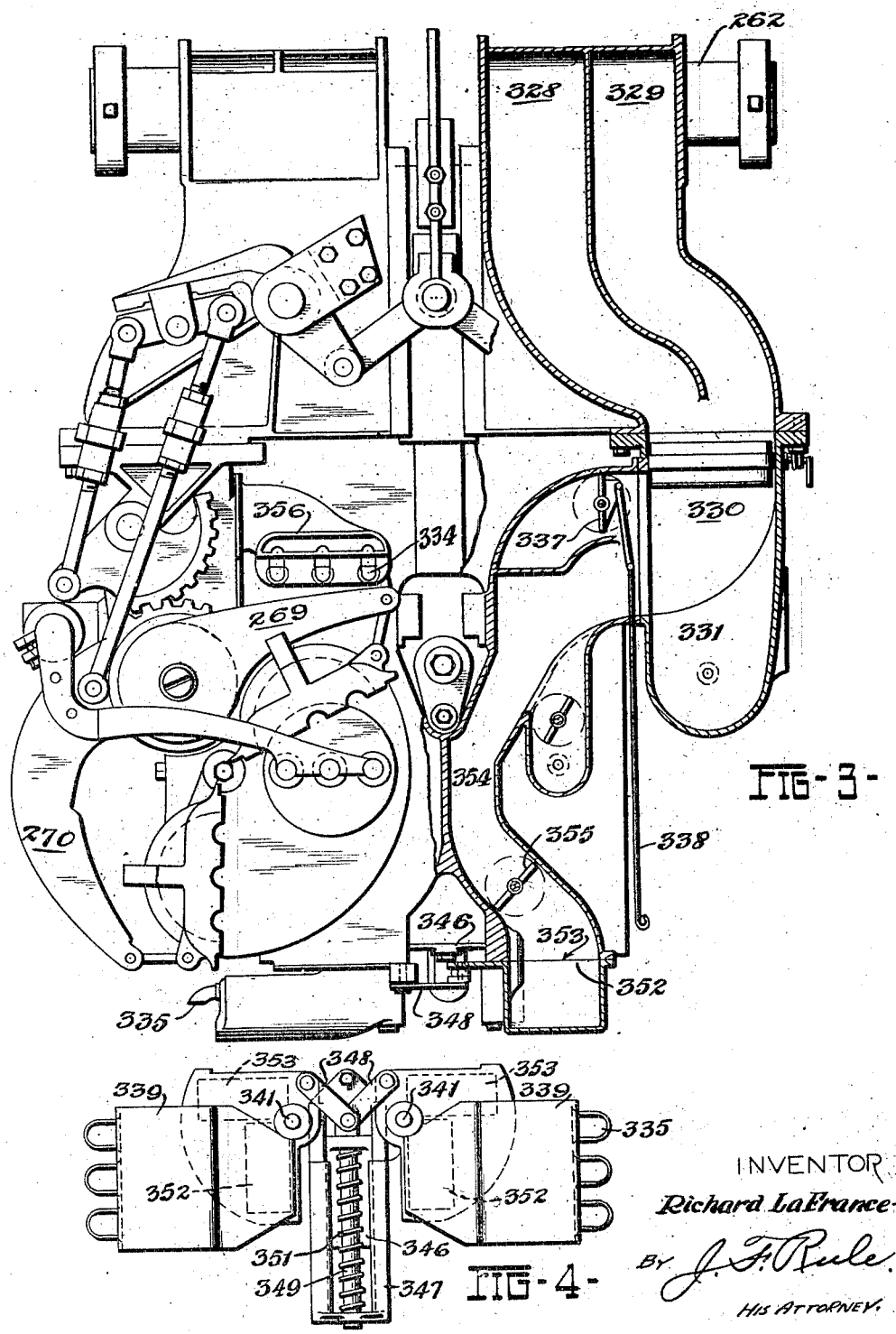
INVENTOR
Richard LaFrance
By J. F. Rule
HIS ATTORNEY

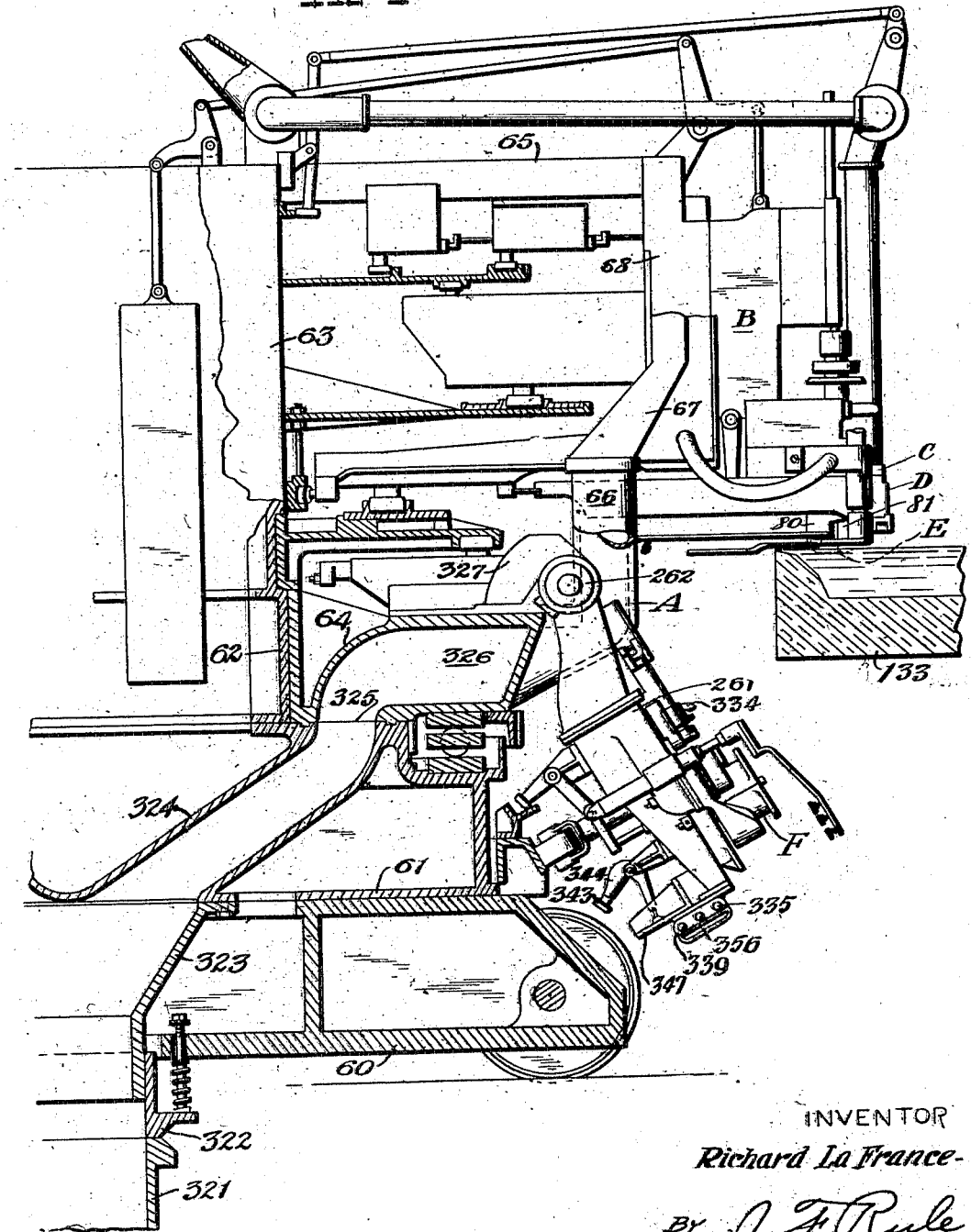

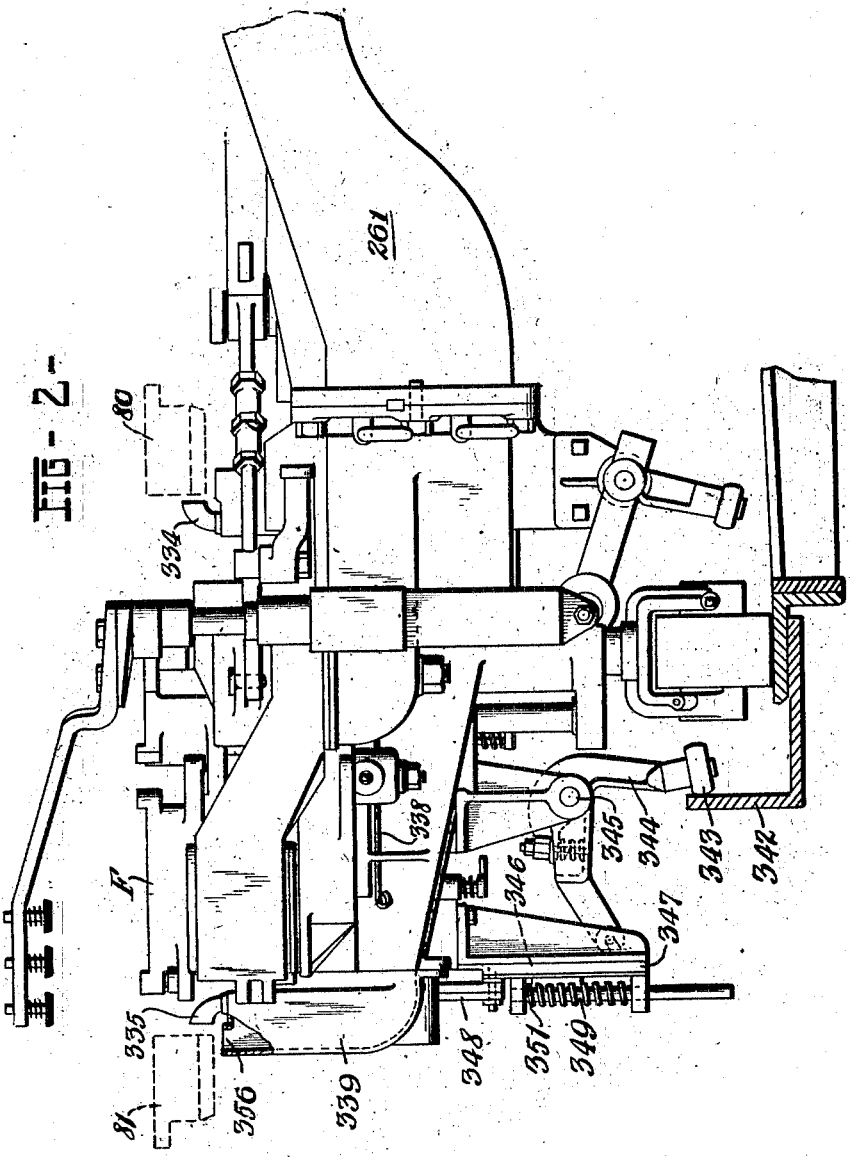

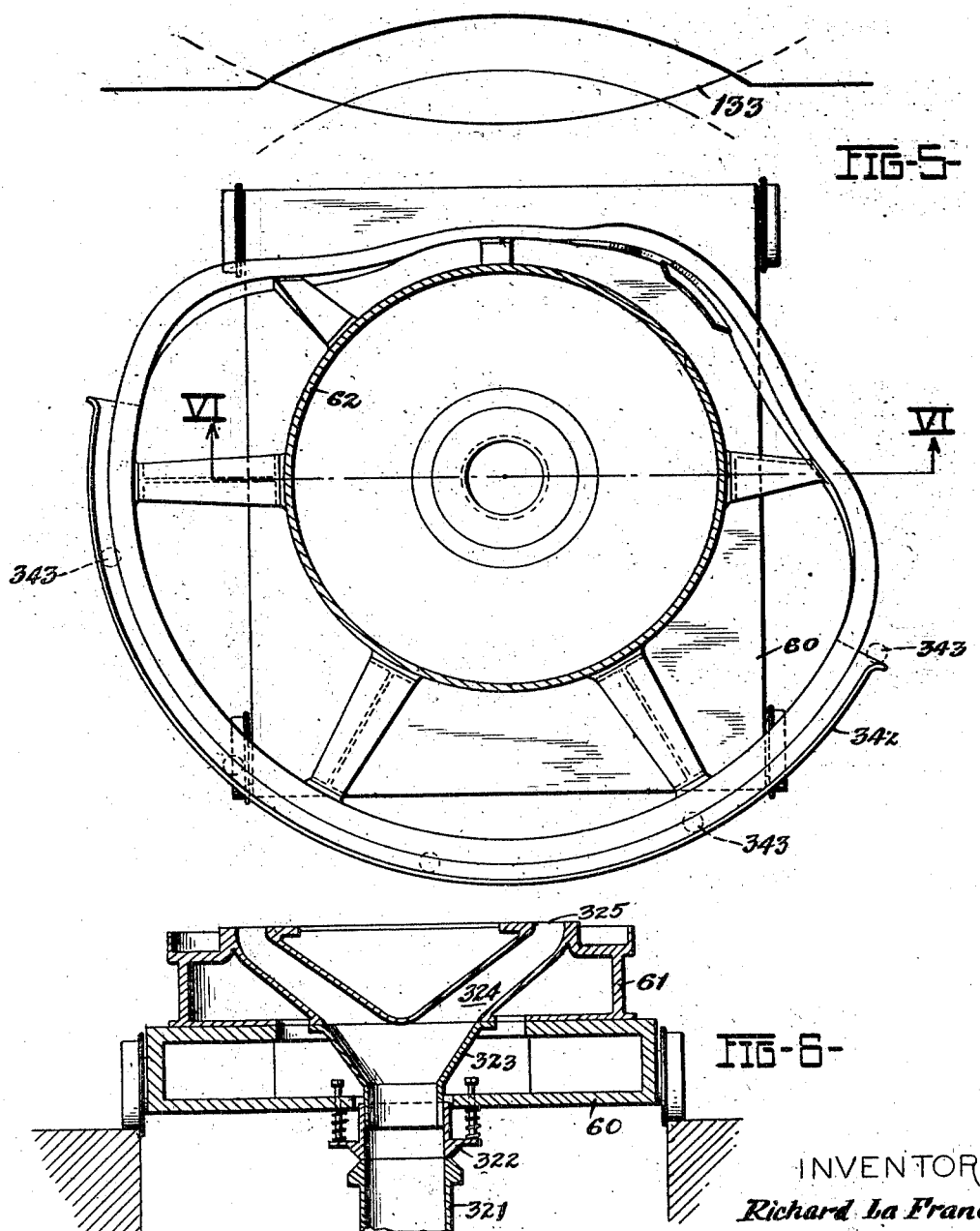

Patented Dec. 17, 1929

1,739,845

UNITED STATES PATENT OFFICE

RICHARD LA FRANCE, OF TOLEDO, OHIO, ASSIGNOR TO OWENS-ILLINOIS GLASS COMPANY, OF TOLEDO, OHIO, A CORPORATION OF OHIO

MACHINE FOR FORMING GLASS ARTICLES

Original application filed April 22, 1924, Serial No. 708,172. Divided and this application filed October 18, 1926. Serial No. 142,166.

The present invention relates to machines for forming glass articles, and more particularly to machines of the Owens type in which blank molds on a continuosuly rotating carriage dip into a pool of molten glass and are filled by suction, the blanks being later transferred to finishing molds in which they are blown to finished form. In machines of this type, a series of heads or units are arranged at equal intervals around the mold carriage, each unit comprising a blank mold or molds into which the glass is drawn by suction, a cooperating finishing mold or molds, and mechanism for effecting the suction, blowing and various mechanical operations required in forming the articles.

In a great majority of machines of this type now in use, a single gathering mold is provided on each head or unit so that only one blank of glass is gathered at a time. In other machines, the capacity is greatly increased by providing each head or unit with a plurality of gathering molds each comprising a plurality of mold cavities which permit gathering a comparatively large number of blanks during the period that the head traverses the gathering tank.

An important feature of the present invention consists in providing cooling nozzles for the molds, so arranged that they are automatically withdrawn to permit the discharge of the finished articles. There is also provided means for automatically cutting off the supply of cooling air while the nozzles are withdrawn, thereby effecting considerable economy in the amount of cooling air used.

Other features of novelty will appear hereinafter.

The present application is a division of my application, S. N. 708,172, filed April 22, 1924, on which has been granted United States Patent Number 1,641,497, September 6, 1927.

In the accompanying drawings:

Fig. 1 is a sectional elevation of the machine, parts being broken away and disclosing the path of travel of cooling air.

Fig. 2 is a side elevation of the finishing mold frame, the cooling nozzles being positioned to cool the blank molds.

Fig. 3 is a part sectional plan view of the finishing mold carrying frame, showing particularly the air connections and a finishing mold in open position.

Fig. 4 is a front elevation of the cooling nozzles carried by the mold frame.

Fig. 5 is a sectional plan view showing a cam track for controlling the cooling nozzles for the blank molds.

Fig. 6 is a vertical sectional view taken on the line VI—VI of Fig. 5, showing the manner in which air is applied through the base of a machine.

Referring particularly to Figure 1, the machine comprises a base 60 on which is mounted a casting 61 supporting the mold carriage which rotates continuously about a central stationary column comprising sections 62 and 63. Stationary cams for actuating various parts of the machine are mounted on said column. The mold carriage comprises a lower frame portion 64 and an upper frame portion 65, united by the frames which support the individual heads or units arranged at equal intervals around the carriage. Each of said units includes blank molds, finishing molds and mechanism for actuating the molds and for effecting the various operations on the glass. Each unit is supported by a framework A (Fig. 1) on the mold carriage, said framework including standards 66 rising from the frame member 64, upwardly and inwardly inclined frame members 67 and vertical portions 68. Mounted to reciprocate vertically in the frame A is a frame B slidable in guideways in the frame A. Bolted to the lower end of the frame B is a blowing head C which carries the neck molds D.

The finishing molds F for each head or unit are carried on a finishing frame 261 having trunnions 262 by which the frame is pivotally mounted on the mold carriage, permitting the frame to swing downward to the Fig. 1 position for passing beneath the tank 133 and then upward to a horizontal position (Fig. 2) to permit enclosure of suspended parisons for final blowing.

The blank molds E comprise separable sections 80 and 81 suitably connected to the frame B so that the blank molds are carried up and down with the frame B. Details of this construction are disclosed in my said Patent, Number 1,641,497. These molds are so mounted that the sections are capable of horizontal reciprocation to move the blank mold sections from their separated position as shown in dotted lines in Fig. 2, to their closed position. The blank mold sections 80 and 81 assume the open position shown in dotted lines in Fig. 2 during the period of transfer of suspended parisons to the finishing molds and during the blowing of the parisons to form completed ware. Because of the heat transmitted to the blank molds from the charges of molten glass, it is necessary to provide some means for reducing the temperature in the mold body, such means, according to the present invention, consisting in the application of cooling air to the blank molds through suitable nozzles which are brought into operative position simultaneously with opening of the molds to the position shown in Figure 2 and enclosure of the parisons by the finishing molds.

Air for cooling the molds and other parts is supplied from any suitable source through a pipe 321 (Figs. 1 and 6) beneath the machine, which, when the machine is in operating position, registers with a pipe section 322 carried on the machine frame. The pipe 322 telescopes with a funnel shaped pipe 323 which opens into air passages 324 in the frame member 61. The passages 324 communicate through openings 325 (Fig. 1), with air chambers 326 formed in the lower section of the mold carriage. Air is supplied from the chamber 326 through passageways 327 (Fig. 1) to channels 328 and 329 (Fig. 3) in the finishing mold frame. Air for cooling the finishing molds is supplied through said channels to air chambers 330 opening into chambers 331 which open into the hollow arms 269 and 270 (Fig. 3). Said arms are provided on their inner faces with nozzles or openings (not shown) through which cooling air is blown against the finishing molds. The air ports between the chamber 331 and the arms 269 and 270 may, if desired, be so arranged that they will be automatically closed during the opening movement of said arms, so that cooling air is supplied only when the finishing molds are closed.

The blank molds are cooled by means of air nozzles carried on the finishing mold frame and brought into position when said frame is swung upward to the horizontal position shown in Fig. 2. These include nozzles 334 and 335 (Figs. 3 and 4) for blowing air against the inner and outer sections 80 and 81, respectively, of the blank molds E. The nozzles 334 are carried on pipe sections 336 opening into the chambers 330 (Fig. 3.) The air supply to the nozzles 334 may be regulated or cut off by means of valves 337 actuated by hand rods 338.

The nozzles 335 are carried on swinging sections or blowers 339 (see Figs. 1, 3 and 4) connected by pivots 341 to the mold frame. These blowers are swung upward from their inoperative position (Fig. 4) to their operative position (Fig. 2) by means of a stationary cam 342 (Fig. 5) on which runs a cam roll 343 on a bell crank lever 344 (Fig. 2) connected by a pivot 345 to the mold frame. The bell crank lever at its forward end engages a slide 346 movable vertically in guides 347, said slide being connected at its upper end through links 348 to the blowers 339. The slide 346 carries a rod 349 on which is mounted a coil spring 351. The cam 342 operates through the bell crank lever to depress the slide plate 346, thereby swinging the blowers upward and compressing the spring 349. This upward movement of the blowers brings the openings 352 formed in the inner faces of the blowers, into registry with corresponding openings 353 (Figs. 3 and 4) at the outer ends of channels 354 (Fig. 3) formed in the mold frame and communicating with the air chambers 330. Hand operated valves 355 are provided in the channels 354 for individually controlling the supply of air to the blowers 339.

The nozzles 334 and 335, as shown in Figure 2, are in position to blow cooling air against the blank molds E while the latter are in their open position. The blowers 339 are at this time held in their upward position by the cam 342. The blowers (Fig. 2) are provided with blow openings 356 in addition to the nozzles 335, arranged to blow air upward against the bottoms of the blank molds. When the finishing mold frame is swung downward, the blowers 339, which at this time are not under control of the cam, are also swung down by their spring 351 to the Fig. 4 position, thereby shutting off the air supply and holding the blowers in position to prevent interference with the discharge of the bottles.

Manifestly, certain minor changes may be resorted to within the spirit and scope of the appended claims.

What I claim is:

1. In a glass forming machine, the combination of a finishing mold, means to open it for discharging an article therefrom, a blower in front of the mold, and automatic means to shift the blower out of the path of articles being discharged from the mold.

2. In a glass forming machine, the combination of a finishing mold, means to open it for discharging an article therefrom, a blower in front of the mold, automatic means to shift the blower out of the path of articles being discharged from the mold, and means operated by said shifting of the blower to control the supply of air thereto.

3. In a glass forming machine, the combination of a finishing mold, a blower arranged in front of the mold, means for opening the mold to discharge articles therefrom, and means to withdraw the blower out of the path of the articles being discharged.

4. In a glass forming machine, the combination of a mold carriage, a sectional blank mold thereon, a neck mold, means to separate the blank mold sections and leave a blank supported in the neck mold, a finishing mold frame, a finishing mold thereon, means to swing said frame upward and thereby bring the finishing mold into position to enclose the blank while the blank mold sections are separated, a blower carried by said frame and brought into position to blow air against the open blank mold when said frame is in said upwardly swung position, automatic means to shift the blower relative to said frame to an inoperative position, and means actuated by said shifting of the blower to cut off the supply of air to the blower.

5. In a glass forming machine, the combination of a frame, a blower thereon, said frame having an air channel through which the air is supplied to the blower, and means to move the blower on the frame into and out of operative position, the channel having a port which opens into the blower when the latter is in operative position and which port is cut off when the blower is in inoperative position.

6. In a glassware forming machine the combination of a support, a finishing mold frame mounted for vertical swinging movement on said support, a finishing mold on said frame, a blower mounted on the frame in front of said mold, means to supply air to the blower, a blank mold, automatic means controlled by movement of the finishing mold frame to withdraw the blower from its position in front of the finishing mold, and automatic means to cut off the flow of air to the blower when the latter is withdrawn.

7. In a machine for forming glass articles, the combination of a support, a finishing mold frame mounted to swing up and down on the support, finishing molds on said frame, blowers mounted on the frame in front of said molds, means for supplying air to the blowers, blank molds, a single actuating device controlled by movement of the finishing mold frame to shift the blowers on said frame and thereby withdraw them from their position in front of the finishing molds, and means carried by the blowers and operated by said shifting thereof for cutting off the flow of air to the blowers when the latter are withdrawn from their position in front of the molds.

8. In a machine for forming glass articles, the combination of a finishing mold frame, a finishing mold thereon, means for swinging said frame up and down along a predetermined path, a blower carried on said frame and associated with the mold, means for moving the blower on said frame and thereby operatively positioning the blower when the mold is at one end of said path and for reversing the movement of the blower on the frame and thereby inoperatively positioning said blower when the mold is at the other end of said path, means for supplying cooling air to the blower, and means whereby the position of the blower relative to said frame controls the flow of cooling air therethrough.

Signed at Toledo, in the county of Lucas and State of Ohio, this 14th day of October, 1926.

RICHARD LA FRANCE.